Oct. 8, 1935.   C. R. WASEIGE   2,016,846
INTERNAL COMBUSTION ENGINE
Filed March 23, 1932
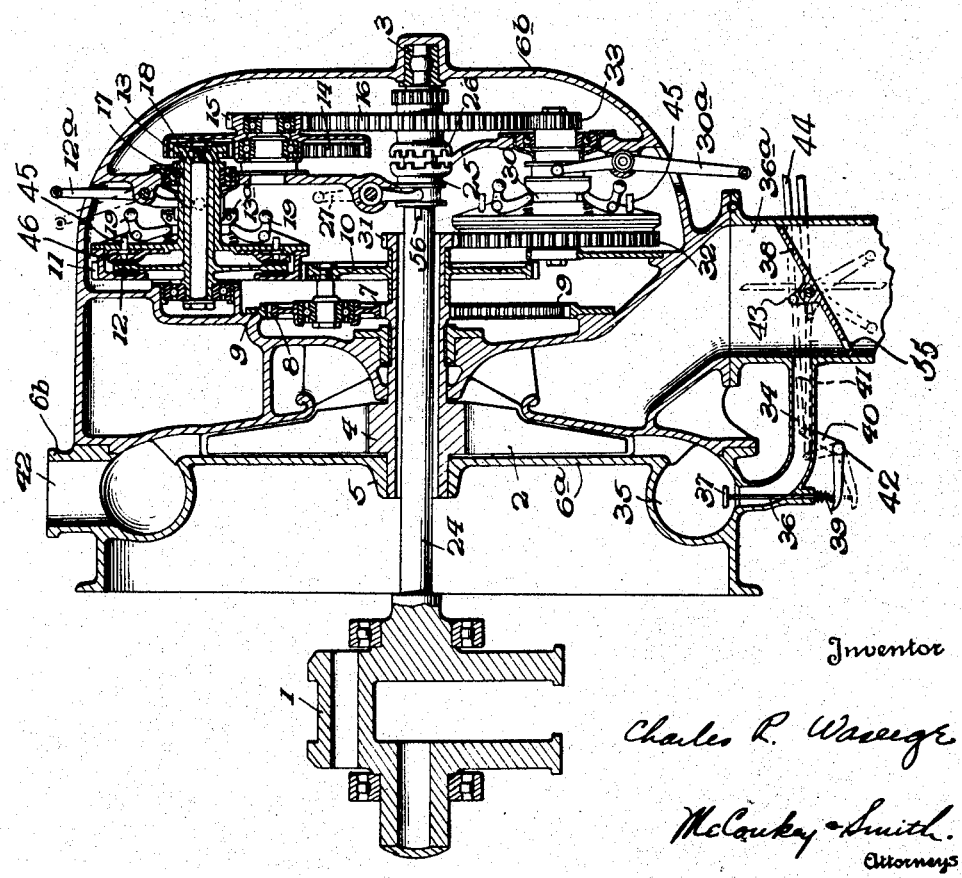
Inventor
Charles R. Waseige
McCauley Smith
Attorneys Patented Oct. 8, 1935

2,016,846

UNITED STATES PATENT OFFICE 2,016,846

INTERNAL COMBUSTION ENGINE

Charles Raymond Waseige, Rueil-Malmaison, France, assignor, by mesne assignments, to Eclipse Aviation Corporation, East Orange, N. J., a corporation of New Jersey Application March 23, 1932, Serial No. 600,779
In France March 30, 1931

9 Claims. (Cl. 123—179)

The present invention relates to internal combustion engines operating according to the Diesel or some similar cycle, that is to say, to engines in which the ignition of the fuel is caused by the injection thereof into a highly compressed fluid.

It has been proposed to increase the power of such engines by increasing the pressure at which the fluid is admitted into the cylinders of the engine. With such a supercharged engine, and more particularly to start the same, it is necessary to have, in the admission passage leading to the cylinders, air under the pressure required to secure ignition temperature within the cylinder, if it is desired not to have recourse to auxiliary ignition devices.

An object of the invention is, therefore, to utilize the supercharging compressor itself for securing the required pressure in the admission passage to the cylinders and in the cylinders themselves.

Another object of the present invention is to cause the pressure in the admission passages to be raised to the desired point before the engine itself is started.

Another object of the present invention is to promote the ignition of the fuel injected into the engine cylinders when the engine is started by raising the temperature and pressure of the air in the admission passages and the engine cylinders by means of the supercharging compressor working in a closed circuit.

A further object of the present invention is to provide a supercharged internal combustion engine including starting means which may be selectively engaged with the supercharging means alone, with the engine alone, or with the supercharging means and the engine simultaneously.

A further object of the present invention is to provide a supercharged internal combustion engine having starting means, wherein means are provided for closing the circuit in which the supercharging means rotates at the same time that the starting means are actuated to start the supercharging means.

A further object of the present invention is to provide a supercharged internal combustion engine having starting means, wherein the starting means are arranged to drive the supercharging means through suitable gearing to which an engine member may be subsequently connected to thereby drive the engine.

A further object of the invention is to provide means for securing the automatic operation of the coupling between the starter and the engine either at the end of a given time after the connection of the starting device and the compressor, or when the pressure developed by the compressor has reached a pre-determined degree, or when the compressor has reached a pre-determined speed.

Another object of the invention is to provide means whereby the engine and compressor may be made to revolve together, such joint revolving being secured preferably by means of the coupling between the starter and the compressor.

Other objects and features of novelty will be apparent from the following detailed description when taken in connection with the accompanying drawing. It is to be expressly understood, however, that the drawing is for purposes of illustration only and is not designed as a definition of the limits of the invention, reference being had for this purpose to the appended claims.

In the drawing wherein similar reference characters refer to like parts throughout the several views:

Figure 1 is a sectional view of the device on a plane passed through the center thereof and also showing part of the engine.

Figure 2 is a view of the starting device showing its relation to parts disclosed in Figure 1.

In the form of invention disclosed in Fig. 1, the reference numeral 1 denotes the crankshaft of an internal combustion engine, such engine being of the Diesel or solid injection type. As shown, the crankshaft 1 is formed with an extension 24 which is suitably journaled at 3 in a two-part casing formed by the shells 6a, 6b. A rotor 2 forming a supercharging compressor is located within the housing 6a, 6b and is formed integrally with or suitably secured to a hollow shaft 4 which is sleeved about the shaft 24. The shaft 4 may be suitably supported in bearings formed within the casing 6a, 6b.

The compressor rotor 2 revolves in a suitably formed housing and the compressor unit includes an intake passage 36a and the usual delivery spiral 35, both generally of usual construction. The intake passage 36a has provided therein a valve member 38 which may be moved to open or close the said intake passage. In the present construction a by-pass is provided between the intake passage and the annular delivery passage, such by-pass being denoted by numeral 34, and is shown as opening into the intake passage on the compressor side of the throttle valve 38. The opening of the passage 34 into the delivery spiral may be closed by a valve member 37, which is normally held in closed position by means such as a spring 39 which is disposed about the rod 36 attached to the valve member 37.

Means are provided whereby the valve member 37 is actuated to open the connection between by-pass 34 and the annular delivery passage 35 when the throttle valve 38 is moved to closed position. Such means may comprise a lever 40, pivotally attached at one end to the lower end of rod 36 and pivotally mounted at its center on a pivot member 42 as shown. The other end of lever 40 is pivotally attached to a link 41 which, at its other end is pivotally attached at 43 to the throttle valve 38. It will be seen that when throttle valve 38 is in its full line position as shown in Figure 1, the valve 37 will be raised, by means of link 41 and lever 40, thereby allowing free passage between delivery passage 36 and annular delivery passage 35 through by-pass 34.

It will be obvious that, assuming the above-described operation to be effected, i. e. the throttle valve 38 closed and the valve 37 opened, and the compressor be thereafter rotated, the rotation of the compressor will be in a closed circuit and the air in such closed circuit will, in a very short time, be under high pressure and the temperature thereof be greatly raised. Such highly heated and compressed air will be delivered to the admission passage 42 of the engine. The valve 38 is preferably provided with a small opening 55 to admit a small amount of air to compensate for leakage on the pressure side of the supercharger.

Referring now to the gearing construction as disclosed more particularly in Figure 1, it will be seen that sleeve shaft 4 is provided, at a point intermediate of its length, with a pinion 7, formed integrally with or suitably attached to shaft 4. Meshing with the teeth of pinion 7 is the planetary pinion 8, which also mesh with an internally toothed ring-gear 9, and are attached to a gear wheel 10, which is sleeved rotatably about shaft 4, the gear system 8, 9, 10 forming an epicyclic gear. Meshing with gear wheel 10 of the epicyclic gear is a gear wheel 11, which is of drum construction and is provided with a centrally-extending sleeve 17, the whole being suitably supported in bearings formed on the casing 6a, 6b. The drum portion of gear 11 is formed internally with annular clutch means which are adapted, on suitable operation, to engage a disk member 12, which is provided with a centrally-extending shaft 18 which carries at its outer end a pinion gear 13. Centrifugally-actuated levers 19 are carried by gear 11, the whole forming a centrifugally actuated means whereby gear 11 may drive, through the clutch means formed internally thereof, plate 12 and sleeve 17, the pinion gear 13. This centrifugally-operated clutch mechanism forms, specifically, no part of my invention, and its details of operation are also no part thereof but the operation is previously described as follows: Outward movement of weights 19 which are pivoted on gear 11 brings them into contact with pins 45 secured to slidable plate 56 and moves the plate into contact with the disc 12 to clamp it against the back face of hollow gear 11. Lever 12a is pivotally mounted on an inward extension of housing 6b and is adapted to move slidable collar 13a to release weights 19 from contact with the pins at the will of the operator.

Gear 13, which, as described above, may be driven by gear 11, engages with an internally toothed gear 14, which is mounted for rotation in suitable bearings formed by the casing 6a, 6b.

Gear 14 is formed centrally with a smaller, externally-toothed pinion 15 which meshes with a large gear-wheel 16, which is sleeved rotatably about shaft 24, and which is formed with clutch means 26 which may be engaged by co-operating clutch means 25 which is slidably attached to shaft 24 by spline 56.

It will be apparent from the above description that if gear wheel 16 is rotated, and clutch means 25, 26 are not engaged, then such rotation will be transmitted by pinion 15, gear wheel 14, pinion 13, through shaft 17 and clutch means 12, gear wheel 11, epicyclic gear train 10, 9, 8 to pinion 7, thereby causing rotation of compressor 2 at a very high speed.

Means are provided for causing such rotation of gear wheel 16, such means comprising, principally, a starting device of any usual type, which is shown at 18 in Fig. 2 of the drawing. On energization of the starting means 18, the rotation thereof will be transmitted, through suitable gearing comprising pinion 47 and gears 48, 49, and 50, to shaft 19, about which is disposed, but not attached thereto, a threaded sleeve 20, on which is threaded a pinion 51. Sleeve 20 is provided with toothed flange 21 forming a stop for the movable pinion 51 which is adapted to be engaged by similar toothed clutching means 22 which are rotatable with and slidable longitudinally on spline 59 by which it is secured to shaft 19. Clutch means 22 are adapted to be moved into and out of engagement with clutch means 21 by means of a yoke member 53 engaging in an annular groove on member 22 as disclosed in Fig. 2, an actuating means 23 being provided for effecting such movement.

It will be seen that when shaft 19 is rotated by means of starting means 18, as described above, clutch means 22 will be rotated with shaft 19 by spline 59 and when such clutch means is moved into engagement with clutch means 21, sleeve 20 will be rotated and pinion 51 will be advanced longitudinally thereon, as in a well known drive construction, the engagement of pinion 51 with gear wheel 16 transmitting the rotation of the starter 18 to gear wheel 16.

The invention contemplates operation of the supercharger by the motor 18 with the throttle 38 in its closed position which movement may be accomplished by actuation of rod 44 at about the same time that rod 23 is moved to a position to engage clutches 21 and 22.

When the rotation of the compressor by means of the starter 18 has supplied air at sufficiently high temperature and pressure to admission passage 42 to insure combustion of the fuel when it is injected into such compressed and heated air in the engine cylinders, the engine crankshaft is caused to rotate by means of the engagement of clutch means 25 and 26. Such engagement is effected by proper manipulation of a handle 27 which is adapted to move clutch member 25, which is slidable on and splined to shaft 24, into engagement with clutch member 26. The engine crankshaft 1 will now be rotated by the starting device 18 through shaft 19, clutch means 21, 22, pinion 17, gear wheel 16, clutch means 25, 26, and shaft 24, and the engine started. On starting of the engine the drive will be reversed and gear wheel 16 will move pinion 51 out of engagement therewith along the threaded shaft 20, due to the fact that gear wheel 16 will have a higher speed than pinion 51.

With the engine running, throttle valve 38 may be opened and valve 37 closed to allow normal operation of the compressor, such valve operation being effected by the manipulation of control rod 44 to close valve 38.

When the engine is operating under its own power, the compressor will be driven thereby, through shaft 24, clutch means 25, 26, gear wheel 16 and thence to the compressor as described hereinbefore.

Means are provided for varying the speed at which the compressor is driven, at the will of the operator, and such selection may be made when the compressor is being driven either by the starting means or by the engine. To this end, the shaft 4 is provided with a gear 31 which meshes with a gear wheel 32, the latter driving through a centrifugal clutch arrangement, the pinion gear 33 which meshes with gear 16. The centrifugal clutch arrangement associated with gear wheel 32 is identical with that associated with gear wheel 11 and its operation may be prevented by means of a shifter collar 30 and lever 30a, operating in a manner identical with lever 12a and disk 13a described hereinbefore. As stated, this particular centrifugally actuated clutch mechanism forms no part of my invention.

It will be apparent that the operator, by selective manipulation of levers 12a and 30a may render effective or ineffective for driving purposes either of the two gear trains, thereby selecting the speed at which he wishes the compressor to be driven. It is also obvious that by disengagement of clutch means 25, 26 when the engine is running, the compressor drive may be isolated altogether and the compressor stopped.

The operation of the device is as follows: When it is desired to start the engine, the clutch means 25, 26 are disconnected, thereby insuring that the engine will not be driven, and the starting force applied to gear wheel 16 by manipulation of starter rod 23 to engage clutch members 21 and 22. Such manipulation causes rotation of sleeve 20 by shaft 19 and the pinion 51 will thereby be moved into engagement with gear wheel 16, transmitting thereto the starting torque of the starter 18. When starting rod 23 is moved, as above described, lever 12a is manually operated to allow driving connection between pinion 13 and gear wheel 11 through the centrifugal clutch. Accordingly the compressor 2, 4 will be rotated. At the same time that starter rod 23 is actuated, valve 38 is closed by movement of rod 44 and valve 37 opened, and the compressor will therefore rotate in a closed circuit, imparting high pressure and temperature to the air in such circuit. When such temperature and pressure have reached the correct degree, or when the compressor has reached a certain speed, the clutch means 25, 26 may be connected and the engine member 1 will thereafter be driven by the starter, and, on proper injection of fuel into the engine cylinders, will be started. As soon as the engine rotates under its own power the gear wheel 16 will rotate the pinion 51 in such a way as to cause the same to move out of engagement along the threaded sleeve 20. The engine will now drive the supercharger as explained hereinbefore, and as also explained, the speed of the supercharger may be varied by proper selection of the gearing through which such supercharger is driven by the engine. Such selection may be made by operation of either lever 12a or 30a, as hereinbefore explained.

While one embodiment of my invention has been illustrated and described herein, it is to be understood that the invention is not limited thereto. Various changes in the shapes, sizes and manner of assembling the various component parts may be resorted to without departing from the scope of the invention, as will occur to those skilled in the art. Reference will therefore be had to the appended claims for a definition of the limits of the invention.

What I claim is:

1. In an internal combustion engine having a crank-shaft, the combination of a supercharger having an inlet and an outlet, means for connecting the inlet with the outlet to form a closed gas circuit in which the supercharger operates, means for connecting and disconnecting the supercharger with and from the crank-shaft, power means for rotating the supercharger when the same is disconnected from the engine, and means for connecting the power means with the engine crank-shaft to start the engine.

2. In an internal combustion engine, the combination of supercharging means a by-pass connecting the high and low pressure sides of the supercharger, starting means, means forming a closed gas circuit including the supercharger and by-pass, means for causing rotation of said supercharging means in the closed circuit by said starting means, means for subsequently rotating said engine by said starting means, and means for causing rotation of said supercharging means by said engine crankshaft.

3. In an internal combustion engine, having a crank-shaft, a starting device for the engine, a supercharging device having a delivery passage and an intake passage, valve means in each of said passages, means for rotating said supercharging device by the starter device without rotating the crank-shaft, and means for actuating said valves whereby said supercharging device rotates in a closed circuit.

4. In an internal combustion engine having a crank-shaft, a starting device for the engine, a supercharging device having a delivery passage and an intake passage, valves in each of said passages, means for connecting the starting device to the supercharger for operating said supercharging device without rotating the crank-shaft, and means for opening said valve in said delivery passage and closing said valve in said intake passage by a single manual operation.

5. In an internal combustion engine having a crankshaft, a supercharger having an outlet to the engine, a valve in the supercharger inlet, a by-pass connecting the outlet and inlet, a valve controlling said by-pass, means for rotating said supercharger independently of the engine at the will of the operator, and means for connecting and disconnecting said supercharger with and from said crankshaft.

6. In an internal combustion engine having a crankshaft, a supercharger having an outlet to the engine, a valve in the supercharger inlet, a by-pass connecting the outlet and inlet, a valve controlling said by-pass, means for simultaneously actuating said valves, means for rotating said supercharger independently of the engine at the will of the operator, and means for connecting and disconnecting said supercharger with and from said crankshaft.

7. In an internal combustion engine having a crankshaft, an annular intake conduit for the engine, a super charger having its outlet in communication with said intake conduit, an intake conduit for the supercharger, means forming a by-pass between the annular conduit and the intake conduit, a valve controlling the by-pass, means for simultaneously opening said by-pass valve and closing said intake valve, means for rotating the supercharger independently of the engine at the will of the operator, and means for connecting and disconnecting said supercharger with and from said crankshaft.

8. In an internal combustion engine having a crankshaft, an annular intake conduit for the engine, a supercharger having its outlet in communication with said intake conduit, an intake conduit for the supercharger, means forming a by-pass between the annular conduit and the intake conduit, a valve controlling the by-pass, means for simultaneously opening said by-pass valve and closing said intake valve, means for rotating the supercharger independently of the engine at the will of the operator, and means for connecting and disconnecting said supercharger with and from said crankshaft, said intake valve having a small opening therein to prevent complete closure of the intake conduit.

9. The method of starting an internal combustion engine which comprises compressing a charge of air and forcibly circulating the same in a closed circuit to increase the temperature thereof, and subsequently rotating the engine crankshaft to draw the heated charge of air into the engine.

CHARLES RAYMOND WASEIGE.